United States Patent [19]

Reitz

[11] Patent Number: 4,849,135
[45] Date of Patent: Jul. 18, 1989

[54] ETHYLENE COPOLYMERS WITH ENHANCED FIRE RESISTANT PROPERTIES

[75] Inventor: Robert R. Reitz, West Chester, Pa.

[73] Assignee: E. I. Du Pont de Nemours and Company, Wilmington, Del.

[21] Appl. No.: 872,662

[22] Filed: Jun. 2, 1986

[51] Int. Cl.$^4$ .................. C09K 21/00; H01B 7/00; C09D 5/16; C09D 5/18
[52] U.S. Cl. ................. 252/606; 106/18.11; 106/18.18; 106/18.31; 174/121 A; 252/601; 252/609
[58] Field of Search .............. 252/601 Q, 609, 606; 524/109, 288; 428/921, 920

[56] References Cited

U.S. PATENT DOCUMENTS

| | | | |
|---|---|---|---|
| 3,228,896 | 1/1966 | Canterino et al. | 260/2.5 |
| 3,928,210 | 12/1975 | Peterson | 252/8.1 |
| 4,012,546 | 3/1977 | Schwartz et al. | 428/921 |
| 4,207,224 | 6/1980 | Randell et al. | 524/123 |
| 4,343,854 | 8/1982 | Moorman | 524/466 |
| 4,430,468 | 2/1984 | Schumacher | 524/109 |
| 4,434,261 | 2/1984 | Brugel et al. | 524/109 |
| 4,443,520 | 4/1984 | Braithwaite, Jr. | 428/438 |
| 4,543,281 | 9/1985 | Pedersen et al. | 428/36 |

FOREIGN PATENT DOCUMENTS

| | | |
|---|---|---|
| 0142074 | 5/1985 | European Pat. Off. . |
| 55-69680 | 5/1980 | Japan . |
| 58-49744 | 3/1983 | Japan . |
| 59-14806 | 1/1984 | Japan . |
| 61-40380 | 2/1986 | Japan . |

Primary Examiner—Howard J. Locker

[57] ABSTRACT

The addition of certain phosphate esters causes ethylene copolymers containing $CaCO_3$ and/or $Ca-Mg/CO_3$ and alumina trihydrate to have lower swell on burning and to have smaller and more uniform cell formation in the ceramic ash than compositions without such esters present.

4 Claims, No Drawings

ETHYLENE COPOLYMERS WITH ENHANCED FIRE RESISTANT PROPERTIES

BACKGROUND OF THE INVENTION

Flame retardant ethylene copolymer materials have long been the subject of research in the flame retardant field, and a number of materials using a number of flame retarding techniques have been developed.

One class of such materials achieves flame retardancy and flame barrier protection by decomposing when subjected to intense heat and high temperature, to form a rigid foam of ceramic ash composed of numerous cells. The cells provide a barrier against heat transfer. In addition such materials are formulated to also release water vapor during the decomposition and cell formation, which also serves to retard spread of fire.

Such materials, which are described in Pedersen U.S. Pat. No. 4,543,281, comprise an ethylene copolymer base or matrix which contains alumina trihydrate and calcium carbonate or calcium-magnesium carbonate. Under ambient conditions these materials are conventional load bearing, melt processible thermoplastics. Under conditions of high heat or fire, the compositions act as a fire barrier and provide low fuel value and low smoke output. As the material decomposes or burns, the Al and Ca ingredients form a ceramic ash that has a cell structure. Because of the cell formation as the cermaic ash builds up, the ash becomes a thermal insulator. Potential applications are in fire stops, as insulating conduit, in wire and cable constructions where high temperature circuit integrity is needed, and many other applications such as protection for structural steel I-beams.

SUMMARY OF THE INVENTION

It has now been discovered that the addition of certain phosphate esters causes these materials to have lower swell on burning and to have smaller and more uniform cell formation in the ceramic ash than compositions without such esters present.

It has also been discovered that the addition of certain fusible glasses will render the rigid foam ceramic ash harder.

DESCRIPTION OF THE INVENTION

Presence of the phosphate ester causes formation of ceramic ash of small cell structure and lower volume swell. In general, cell size in ash formed from the materials of this invention ranges between about 1-2 micrometers. Small cell structure is advantageous because there is less chance for structural failure.

In a preferred embodiment, the compositions of this invention are fire retardant and fire barrier materials which comprise
(a) a matrix comprising 10-40 percent by weight of at least one ethylene copolymer,
(b) 35 to 89 percent by weight of composition (a), (b) and (c) of a mixture of
  (i) alumina trihydrate and
  (ii) calcium carbonate or
calcium-magnesium carbonate or both, said mixtures containing a percent weight ratio of (i) to (ii) of 30/70 to 70/30, and
(c) 1 to 25 percent by weight of composition (a), (b) and (c) of a tri(hydrocarbyl) phosphate ester.

The ethylene copolymer matrix used in the compositions of the invention are comprised of about 40 to 95% by weight ethylene, preferably 45-90% and most preferably 60-85%. A comonomer or a mixture of comonomers comprise the remainder of the copolymer. Examples of comonomers include vinyl esters of carboxylic acids of 2 to 18 carbon atoms, such as vinyl acetate; esters of unsaturated carboxylic acids or diacids of 4 to 18 carbon atoms such as methacrylates or acrylates; and alpha-olefins of 3 to 12 carbon atoms. In addition minor amounts of other polymer units can be present such as carbon monoxide (CO). Examples of copolymers include ethylene/vinyl acetate, ethylene/ethyl acrylate, ethylene/propylene, ethylene/octene, ethylene/methyl acrylate. Where appropriate, as, for example, with the acrylate comonomers, up to 15% by weight CO can be present.

The melt index of the copolymers is generally between 0.1 to 150 g/10 min, preferably 0.3 to 50 g/10 min, and most preferably 0.7 to 10 g/10 min. In addition mixtures of copolymers can be used. The amount of the ethylene copolymer present will be between about 10-40% by weight of the composition, preferably 15-35% and most preferably 18-30%.

The alumina trihydrate has the formula $Al_2O_3 \cdot 3H_2O$ and is preferably of 1-2 micron average particle size. Larger particles tend to give a larger volume expansion during burning which results in a weaker ceramic ash. Smaller particles, especially those below 0.5 micron, tend to increase viscosity of the composition melt, which reduces processing ease.

The calcium carbonate or calcium-magnesium carbonate will preferably have a particle size of 1 to 3 microns in diameter. Larger particles tend to result in a weaker ash structure due to less surface available for ceramic sintering. Smaller particles, especially those below 0.07 micron diameter produce a hard ceramic ash, but the foaming during burning is low and the viscosity of the composition tends to be high.

In general the ratio of the alumina trihydrate to the calcium compound will be between a 30/70 and a 70/30 weight ratio preferably 40/60 and 60/40 and most preferably 45/55 and 55/45. The total amount of both in the composition will generally be between 35-89 weight percent of the composition, preferably 50-83 wt. percent, and most preferably between 60-78 wt. percent.

The phosphate ester increases the flexibility of the composition and reduces the processing viscosity. It unexpectedly acts during burning to produce uniform, small cell structure in the ceramic ash. The phosphate esters are tri(hydrocarbyl) phosphates. The hydrocarbyl groups can be alkyl of 2-20 carbons or aryl of 6-20 carbons. They can be substituted or oxygen-interrupted. The amount of ester that can be used will be between 1 and 25 weight percent based on composition, preferably between 2 and 15 weight percent, and most preferably between 4 and 10 weight percent.

The compositions can be prepared simply by mixing the ingredients into a melt of the polymer. A commercially sized batch-type Banbury or equivalent intensive mixer is suitable for preparing the compositions of the invention. Dry ingredients are charged in routine fashion. It is convenient in most cases to inject the phosphate component directly into the mixing chamber of either unit as per widely used practice with this type of equipment.

Optionally, the composition may also contain a borosilicate glass. It acts to harden the ceramic ash formed at lower temperatures than those that normally activate the Ca-Al complex. The glass is a low temperature fusible glass (i.e., fusible at 600°-1000° C.) and is generally sodium, potassium, calcium, magnesium or zirconium borosilicate. When used, the borosilicate glass can be present in amounts of up to 30 weight percent of the composition, but too much borosilicate can reduce structure stability at curing temperatures. Therefore a balance must be maintained between the structural integrity of the ash and the propensity to harden the ash.

In addition, the composition can contain cut fiber glass strands to increase the stiffness of the composition. On burning, a composition containing fiberglass expands to a lesser degree than one without fiberglass. The fiberglass is preferably cut in ¼-inch sections and can be present in amounts of up to 20 wt. % based on composition.

An aliphatic carboxylic acid surfactant such as stearic acid can also be added to aid in dispersing the Ca-Al mixture. The surfactant also appears to enhance elongation and increase melt index.

EXAMPLES

All blends in the following examples were prepared in a mixer such as a Banbury or Brabender "Prep Center" mixer. All ingredients were added to the mixing chamber at a level which amounted to 70-80% of the internal volume of the mixer, based on melt or form. The ingredients were mixed for 5 to 10 min. at a rotor speed adjusted to maintain the temperature between 160°-190° C. The materials were then removed after cooling and then compression molded at 150° C. into shapes necessary for testing.

EXAMPLE 1

In this Example, seven blend samples were prepared. The ingredients present in each are listed in Table I, along with the properties determined.

Comparative Samples 1, 2, and 3 are examples of ethylene/vinyl acetate copolymer (EVA) filled with the minerals taught in U.S. Pat. No. 4,453,281, which also contain "conventional" plasticizers.

Samples 4, 5 and 6 are examples of compositions of the invention. They
 1. show good thermoplastic properties, e.g. elongation, MI, flexibility.
 2. have low flammability as seen by the Limiting Oxygen Index (LOI).
 3. produce thermal insulating ash when burned at high temperatures (1000° C./3 hr).
 4. and unexpectedly, show a controlled, lower volume swell on burning. This gives a self-supporting ash with much finer cell structure than samples 1-3.

Examples 4-6 are very flexible compositions with elongations of more than 500%. In addition the controlled, lower volume swell during burning produces an improved ash for structural integrity.

TABLE I

THERMOPLASTIC FIRE BARRIER COMPOSITIONS
(Effects of Various Plasticizers)

| Composition Wt. % | Sample Number | | | | | |
|---|---|---|---|---|---|---|
| | 1 | 2 | 3 | 4 | 5 | 6 |
| Ethylene Copolymer (Ethylene/vinyl Acetate (75/25) melt index 2.01[1] | 22.5 | 22.5 | 22.5 | 22.5 | 22.5 | 22.5 |
| Aluminum trihydrate[2] | 35 | 35 | 35 | 35 | 35 | 35 |
| Calcium Carbonate[3] | 35 | 35 | 35 | 35 | 35 | 35 |
| Stearic Acid | 1.5 | 1.5 | 1.5 | 1.5 | 1.5 | 1.5 |
| Aromatic Processing Oil[4] | 6 | | | | | |
| Naphthenic Processing Oil[5] | | 6 | | | | |
| DOP plasticizer[6] | | | 6 | | | |
| Tricresyl phosphate[7] | | | | 6 | | |
| Triaryl phosphate ester[8] | | | | | 6 | |
| Tributoxyethyl phosphate[9] | | | | | | 6 |
| Physical Properties | | | | | | |
| Stress-Strain (D1708)[10] (%) | | | | | | |
| Elongation at break | 440 | 521 | 639 | 552 | 605 | 578 |
| Yield (MPa) | 2.88 | 2.62 | 2.25 | 1.99 | 2.05 | 1.6 |
| Tensile Strength (MPa) | 2.77 | 3.01 | 3.12 | 2.79 | 3.17 | 2.5 |
| Melt Index[11] (2160 g/190° C.) | 2.06 | 2.56 | 3.01 | 2.39 | 2.12 | 3.6 |
| Flexural Modulus[12] (MPa) | 152 | 137 | 108 | 137 | 67 | 59 |
| Burning Properties Sample: | a 1 × 3 × .25 in. plaque; burned RT to 1000° C./3hr. | | | | | |
| Volume Increase[13] (%) | 397 | 340 | 245 | 132 | 150 | 208 |
| Crush Strength[14] (Pa) | 11 | 37 | 85 | 221 | 72 | 54 |
| Thermal Conductivity Test Sample[15] plaque 0.2 in. thick burned above 1000° C. flame; IR Detector Top Surface Temperature (°C. at 30 min.) | 405 | 300 | 302 | 289 | 307 | 330 |
| Burn Quantification[16] Limiting Oxygen Index (LOI - the higher, the | 31.5 | 32.6 | 33.6 | | 33.2 | 32.9 |

TABLE I-continued
THERMOPLASTIC FIRE BARRIER COMPOSITIONS
(Effects of Various Plasticizers)

| Composition Wt. % | Sample Number | | | | | |
|---|---|---|---|---|---|---|
| | 1 | 2 | 3 | 4 | 5 | 6 | better fire retardancy)

Microphotographs show a uniform small cell size for samples of Examples 4–6, but not for samples of Examples 1–3. Microphotography at 2X magnification were prepared of cut samples and the largest voids or cells measured. The cells of samples of Examples 1–3 had an average size between 3.5 and 4.5 mm in diameter while those of samples of Examples 4–6 were between 1 and 2 mm in diameter.

Footnotes for Table I:
Components:
[1] EVA copolymer (25 wt. % VA; 2.01 MI)
[2] "Hydral" 710: Alumina trihydrate from Alcoa; nominal 1 micron diameter particle size.
[3] "Atomite": $CaCO_3$ from Thompson-Weineman Co.; 1–3 micron diameter particle size.
[4] "Sundex" 790: aromatic process oil from Sun Oil Co.
[5] "Circosol" 4240: naphthenic processing oil from Sun Oil Co.
[6] DOP: Dioctylphthalate plasticizer
[7] TCP: Tricreasyl phosphate plasticizer
[8] "Kronitex": a triaryl plasticizer from FMC Inc., namely, a mixture of isopropylphenyl phenyl phosphates, i.e.,

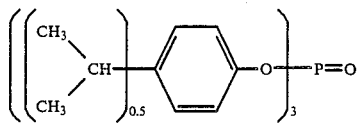

[9] TBEP: tributoxyethyl phosphate plasticizer.
Testing:
[10] Stress-Strain: ASTM D1708, 2 in./min; .125 in. (32 mm) nominal compression molded plaque.
[11] Melt Index: ASTM 1238 condition E
[12] Flexural Modulus: ASTM D790: .125 in. (32 mm) nominal compression molded plaque.
[13] Volume Increase (on burning): a compression molded plaque 1 × 3 × 0.25 in. (2.54 × 7.62 × .63 mm) is placed in a cold muffle furnace. Power is turned on and reaches set temperature of 1000° C. in 45 min. to 1 hr. Sample remains in the oven for a total time of 3 hr. Dimensions (length, width, and height) are measured with a caliper before and after burning. Volume increase is calculated as a percent increase over original volume.
[14] Crush Strength: the ceramic ash sample from the above burning (see 14) is tested for compressive strength as follows. On the top crosshead of an Instron Tensile Tester we attach a 1 inch (2.54 cm) diameter rod, pointed down. With a crosshead speed of 2 in/min, resistance to the rod pushing through the ash is measured. Resistance to crushing is measured while the rod pushes through the top 2/3 height of the sample. The chart reading in force is divided by the surface area of the rod end (0785 sq. in.).
[15] Thermal Conductivity Test: A compression molded plaque 4.5 × 4.5 × 0.2 in. (11 × 11.4 × .51 cm) is supported on a ring stand and wire grid above a "Fisher" laboratory burner with a flame temperature of 1000° C. impinging on the bottom surface of the plaque. The top surface temperature of the plaque is monitored using an "Omega" Infrared Pyrometer supported 12 in. (30 cm) above the plaque. Relative insulating ability is indicated by temperature after 30 min. of burning.
[16] Limiting Oxygen Index: ASTM D2863

Microphotographs show a uniform small cell size for samples of Examples 4–6, but not for samples of Examples 1–3. Microphotography at 2X magnification were prepared of cut samples and the largest voids or cells measured. The cells of samples of Examples 1–3 had an average size between 3.5 and 4.5 mm in diameter while those of samples of Examples 4–6 were between 1 and 2 mm in diameter.

EXAMPLE 2

Samples were prepared as shown in Table II.

Sample 1 is a preferred composition of the invention showing use of a particular phosphate ester plasticizer. Samples 2 and 3 show further embodiments of the invention where glass "frit" and fiberglass cut strands enhance the strength of the ash at lower burn temperatures. The data shows these materials to be good thermal insulators, plus samples 2 and 3 have higher crush resistance than 1 at lower burn temperatures. The significance of this is that in many construction or building fire conditions the temperature rises more slowly and peaks at a lower temperature than hydrocarbon fuel-fed fires. It is important then that ash be strengthened at these lower temperatures. In comparing Examples 2 and 3, the fiberglass may act synergistically with the frit to help maximize crush resistance of the ash. In that respect then sample 3 may be preferred in some applications.

A limitation on the use of glass frit is that at higher frit loadings or higher temperatures, the ash begins to act more like a "glass" in that it begins to flow. For example, at 20% frit loading and 1000° C. burn, the ash after three hours has large glassy bubbles and has reduced its volume expansion from its original level. On the other hand, Sample 3 at 1100° C. forms a reasonable ash immediately on burning but the ash has shrunk considerably after an hour. Diminished volume expansion or large bubbles in the ash reduce the material's insulating ability.

TABLE II
COMPOUNDING WITH GLASS "FRIT" AND FIBERGLASS STRANDS

| Sample # | 1 | 2 | 3 |
|---|---|---|---|
| Composition Wt. % | 21 | 21 | 21 |
| Ethylene Copolymer | | | |
| Aluminum Trihydrate | 36.5 | 31 | 30.5 |
| Calcium Carbonate | 36.5 | 31 | 30.5 |
| Ferro Frit 3185[1] | | 10 | 10 |
| Fiberglass, PPG 3540[2] | | | 2 |
| Triaryl phosphate ester | 4.5 | 4.5 | 4.5 |
| Stearic Acid | 1.5 | 1.5 | 1.5 |
| Physical Properties[3] | | | |
| Stress-Strain (D1708) | | | |
| Elongation % | 491 | 453 | 495 |
| Yield (MPa) | 2.73 | 2.23 | 2.38 |
| Tensile (MPa) | 2.77 | 2.18 | 2.7 |
| Melt Index (Condition E) | 1.37 | 1.38 | 1.11 |
| Flexural Modulus (MPa) | 131 | 117 | 138 |
| Burning Properties | | | |

1 × 3 × .25-inch samples burned in a furnace for various times and temperature
Crush Strength (MPa)

TABLE II-continued
COMPOUNDING WITH GLASS "FRIT" AND FIBERGLASS STRANDS

| Sample # | 1 | 2 | 3 |
|---|---|---|---|
| (burn temp./burn time) | | | |
| 1000° C./3 hr. | 0.2 | 1.76 | 1.76 |
| 900° C./3 hr. | 0.069 | 0.3 | 0.41 |
| 800° C./3 hr. | 0.003 | 0.014 | 0.062 |
| Volume Swell (%) | | | |
| (burn temp./burn time) | | | |
| 1000° C./3 hr. | 135 | 155 | |
| 900° C./3 hr. | 155 | 203 | 155 |
| 800° C./3 hr. | 177 | 222 | 117 |
| Thermal Conductivity Test | | | |
| Top Surface Temperature (°C. at 30 min.) | 285 | 281 | 266 |

Notes:
[1] Ferro Frit 3185: a low fusion temperature sodium borosilicate glass with fusion temperature of 750° C.; 200 mesh powder; from Ferro Corp.
[2] PPG 3540: cut strand fiberglass; type E glass; from PPG Industries.
[3] See Table I notes for other components and test details.

I claim:
1. A flame retardant composition comprising
   (a) a matrix comprising 10–40% by weight of at least one ethylene copolymer,
   (b) 35 to 89 percent by weight of composition (a), (b) and (c) of a mixture of
      (i) alumina trihydrate and
      (ii) calcium carbonate or calcium-magnesium carbonate, or both, said mixture containing a percent weight ratio of (i) to (ii) of 30/70 to 70/30
   (c) at least one compound selected from 1 to 25 percent by weight of compositions (a), (b) and (c) of a tri(hydrocarbyl) phosphate ester.
2. The composition of claim 1 wherein component (c) is a mixture of isopropylphenyl phenyl phosphates.
3. The compositions of claim 1 or 2 which also contains a low fusion temperature glass.
4. The composition of claim 1 or 2 which also contains chopped fiber glass.

* * * * *